United States Patent [19]

Yip et al.

[11] Patent Number: 5,623,645
[45] Date of Patent: Apr. 22, 1997

[54] METHOD AND APPARATUS FOR ACQUIRING BUS TRANSACTION DATA WITH NO MORE THAN ZERO-HOLD-TIME

[75] Inventors: Thomas C. Yip, Los Gatos; Hemanth G. Kanekal, San Jose, both of Calif.

[73] Assignee: Cirrus Logic, Inc., Fremont, Calif.

[21] Appl. No.: 513,374

[22] Filed: Aug. 10, 1995

[51] Int. Cl.$^6$ .................................................. G06F 13/38
[52] U.S. Cl. ............................................ 395/551; 395/280
[58] Field of Search ................................... 395/550, 280, 395/185.09

[56] References Cited

U.S. PATENT DOCUMENTS

5,361,267  11/1994  Godiwala et al. ................ 371/40.1
5,457,694  10/1995  Smith .................................. 371/20.1

Primary Examiner—Thomas M. Heckler
Attorney, Agent, or Firm—Frank D. Nguyen

[57] ABSTRACT

An apparatus and method for acquiring data information provided by a synchronous bus transaction with at most zero hold-time. A transparent latch circuit is used to capture bus transaction information before a rising clock edge of the next clock cycle following a bus transaction request and a data phase starting signal thereby meeting the zero-hold requirement. At the same time, bus transaction information is decoded to determine whether the current phase is a data phase, data information is present in the current bus transaction, memory addresses presented are within an allowable range, and bus transaction command is of the type recognized. If all the above conditions are met, the information captured by the transparent latch circuit is registered by a synchronous flip-flop circuit as valid data information.

14 Claims, 10 Drawing Sheets

METHOD AND APPARATUS FOR ACQUIRING BUS TRANSACTION DATA WITH NO MORE THAN ZERO-HOLD-TIME

CROSS-REFERENCED APPLICATION

Application entitled "Method and Apparatus for Acquiring Bus Transaction Address and Command Information with No More Than Zero-Hold Time and With Fast Device Acknowledgement", by Kanekal et al., filed Aug. 10, 1995, U.S. Ser. No. 08/513,375.

TECHNICAL FIELD

This invention relates generally to peripheral hardware controllers in computer systems, and more particularly to a controller coupled to the Peripheral Component Interconnect (PCI) Local Bus.

BACKGROUND ART

In the area of digital systems, the task of accommodating increasing bus traffic continues to pose a challenge. The primary bottle-neck in most bus transactions appears to be the system bus. The system bus is a bottle-neck primarily because many devices share the same bus and must contend for its resources.

Figure 1:
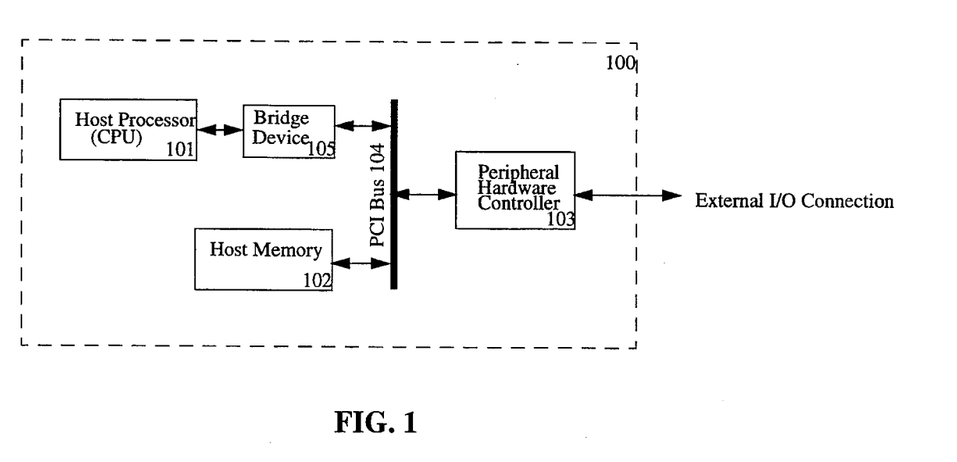
FIG. 1 is a block diagram of a computer system including a PCI local bus.

The PCI bus is a high performance, 32-bit or 64-bit bus with multiplexed address and data lines which can accommodate multiple high performance peripherals. The PCI Bus supports burst modes in which a bus transaction may involve an address phase followed by one or more data phases in tandem with a command phase followed by one or more byte enable phases. As such, an external device may require the use of the bus for multiple clock cycles during a bus transaction which can exacerbate bottle-neck problems associated with a system bus. Reference is now made to FIG. 1 which illustrates an overview of a computer system that utilizes the PCI bus. In FIG. 1, computer system 100 comprises host CPU 101, host memory 102, peripheral hardware controller 103, and bridge device 105. Peripheral hardware controller 103 is coupled to host CPU 101 and host memory 102 through PCI bus 104. More particularly, peripheral hardware controller 103 provides an interface between PCI bus 104 and external devices such as disk drivers, display monitors, parallel data port, local area network, wide area network, or the like.

In general, host CPU 101 and external devices may take turns controlling PCI bus 104 in carrying out transactions such as read and write transactions. While a device which takes control of PCI bus 104 to initiate the transaction is known as a "bus master" device, a device at the other end of the transaction is known as a "bus target" (or "slave") device. Information associated with bus transactions between devices include data, address, commands, byte enables, and identification of bus master and bus target device.

While a bus may be synchronous or asynchronous, PCI bus is a synchronous bus. In other words, information flowing from the bus master device to the target device and vice versa are synchronized to a system clock such that a bus transaction must take place in an integral number of synchronized clock cycles. In carrying out bus transactions, bus protocols must be followed. These protocols consists mainly of bus mastership, requests for read or write transactions, and acknowledgment of such requests. PCI bus protocols can be found in "The PCI Local Bus Specification Rev 2.0", published by the PCI Special Interest Group, P.O. Box 14070, Portland, Oreg. 97214 and incorporated herein by reference.

Required tasks associated with synchronous PCI bus transactions such as address decoding, command decoding, and byte enable decoding must be generated based on the system clock. As a result, more than one system clock cycle may be required to acquire or capture data following a starting data phase signal by either a bus master or a bus target depending on whether a write or a read transaction is involved. Following a generation of a starting data phase signal requiring one clock cycle, one additional clock cycle may be required for byte enable information decoding. For example, a bus master may send byte enable information to a bus target during a first clock signal following a starting data phase signal, the bus target receives byte enable information and performs the necessary task of byte enable information decoding during a second clock cycle. The bus target then acquires data during a third clock cycle. The use of three clock cycles slows down the bus transaction as a result.

Another challenge presented by the PCI bus involves a requirement for zero nano-second hold time. To allow sufficient time for information related to a bus transaction (i.e., command, address, and data) to arrive at a destination, the "PCI Local Bus Specification" allows a set-up time, $t_{su}$, of up to 7 nano-seconds from the time a bus transaction signal indicating the start of an information phase (e.g., address, data, command, etc.) is asserted until the next clock cycle begins. Moreover, once bus transaction data is made available, the "PCI Bus Specification" allows zero nano-second hold-time, $t_h$, for a device to properly acquire bus transaction data until the beginning of a next clocking cycle. The failure to meet the zero-hold time requirement may lead to the capturing of invalid bus transaction information since a different information phase may begin in the following clock cycle. In other words, the zero nano-second hold-time requires bus transaction information to be preserved during the clock cycle in which that particular bus transaction information is put on a system bus.

Figure 2A:
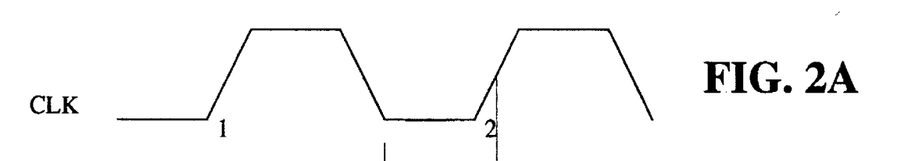
FIG. 2 is a timing diagram illustrating the set-up time, $t_{su}$, and holding time, $t_h$, associated with a PCI bus transaction.
Figure 2B:
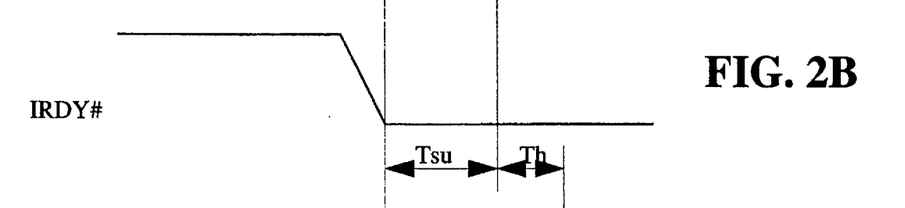
Figure 2C:
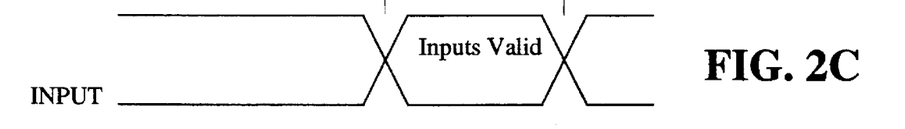

Referring now to FIG. 2 which is a write transaction timing diagram illustrating set-up time, $t_{su}$, and hold-time, $t_h$. An exemplary timing diagram associated with a read transaction can be similarly derived. In FIG. 2, during clock cycle 1, signal IRDY# is asserted indicating the start of the data phase. However, required processing time may cause signal IRDY# to be asserted approximately at a middle part of clock cycle 1. At this point, data information is made available on the system bus. Bus transaction information is to be available by $t_{su}$ before the next rising clock edge. Once data information is made available, more than zero nano-seconds is needed to properly acquire the bus transaction information. As a result, the zero nano-second hold-time requirement as currently imposed by the "PCI Local Bus Specification" is unresolved.

OBJECTS AND SUMMARY OF THE INVENTION

One object of the present invention is to capture synchronous bus transaction data with no more than zero hold-time following a data phase starting signal.

Another object of the present invention is to capture synchronous bus transaction data with minimum delay.

These and other objects are met by various aspects of the present invention, wherein briefly stated, one aspect is an apparatus for acquiring data information from a synchronous bus transaction which operates with no more than zero hold-time. A register circuit is coupled to a system bus. The register circuit acquires information provided by the synchronous bus transaction in response to a predetermined logic state of a system clock signal. A signal generator is coupled to the system bus and receives as input the system clock signal. The signal generator generates a synchronous signal indicating whether the bus transaction information acquired is valid data information. A synchronous register circuit is coupled to the register circuit and the signal generator. The synchronous register circuit registers valid data information acquired by the register means in response to a predetermined edge of the synchronous indicating signal.

Another aspect of the present invention is a computer system including a host processor, a system memory, a system bus coupling the host processor to the system memory, and a peripheral hardware controller interposed between the system bus and external devices. The peripheral hardware controller further includes an apparatus for acquiring data information from a synchronous bus transaction which operates with no more than zero hold-time. A register circuit is coupled to a system bus. The register circuit acquires information provided by the synchronous bus transaction in response to a predetermined logic state of a system clock signal. A signal generator is coupled to the system bus and receives as input the system clock signal. The signal generator generates a synchronous signal indicating whether the bus transaction information acquired is valid data information. A synchronous register circuit is coupled to the register circuit and the signal generator. The synchronous register circuit registers valid data information acquired by the register means in response to a predetermined edge of the synchronous indicating signal.

Still another aspect of the present invention is a method for acquiring data information from a synchronous bus transaction which operates with no more than zero hold-time. Information provided by the synchronous bus transaction is acquired in response to a predetermined logic state of a system clock signal. A determination is made as to whether the synchronous bus transaction information acquired is valid data information. A synchronous signal indicating that the synchronous bus transaction information is valid is generated. Data information acquired in the acquiring step is registered in response to a predetermined edge of the synchronous indicating signal.

All the features, with their advantages of the present invention will become apparent from the following detailed description of its preferred embodiment, which description should be taken in conjunction with the accompanying drawings

DETAILED DESCRIPTION OF THE INVENTION

Figure 3:
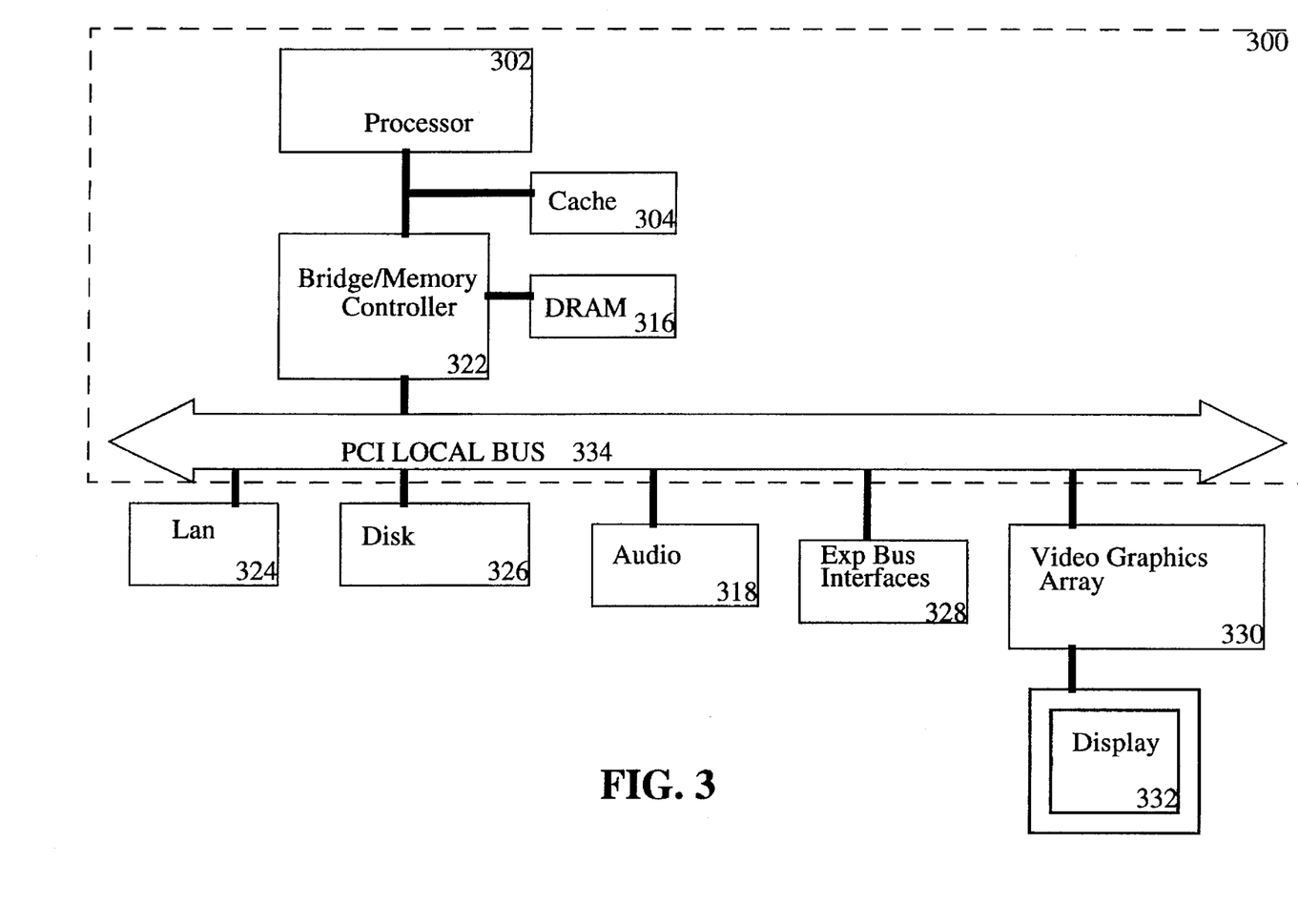
FIG. 3 is a block diagram of a computer system utilizing aspects of the present invention.

FIG. 3 is a block diagram of computer system 300 utilizing aspects of the present invention. Computer system 300 comprises a host processor system chip set which includes host processor 302, cache memory 304, bridge/memory controller 322, and dynamic random access memory 316. Host processor 302 may be any one of a number of commercially available microprocessors such as those marketed by Intel® (Santa Clara, Calif.) and Motorola® (Schaumburg, Ill.). PCI bus 334 couples bridge-memory controller 322 to a number of external devices such as local area network controller 324, hard disk controller 326, audio controller 318, video graphics array 330, and other expansion bus interfaces 328. Video graphics array 330 may drive display device 332 such as a monitor or a liquid crystal display device.

Bridge/memory controller 322 is used to directly access any external device coupled to PCI bus 334. Generally, such external devices are mapped in memory or I/O address spaces. Bridge/memory controller 322 also performs data buffering/posting and PCI bus central functions (e.g., arbitration). While bridge/memory controller 322 may be considered as a PCI bus master, any of the external devices coupled to PCI bus 334 may also act as a bus master.

Although the present invention is practiced in a PCI bus environment, it is to be understood that the invention is applicable to any type of synchronous system bus with appropriate protocols. Furthermore, while the present invention has applicability in peripheral hardware controllers such as disk controllers, audio controllers, LAN controllers, and the like, the best mode for practicing the invention is as part of a video graphics array. The present invention is implemented as part of the CL-GD5434 Graphics User Interface Accelerator. The CL-GD5434 is manufactured and marketed by Cirrus Logic, Inc. of Fremont, Calif.

Figure 4:
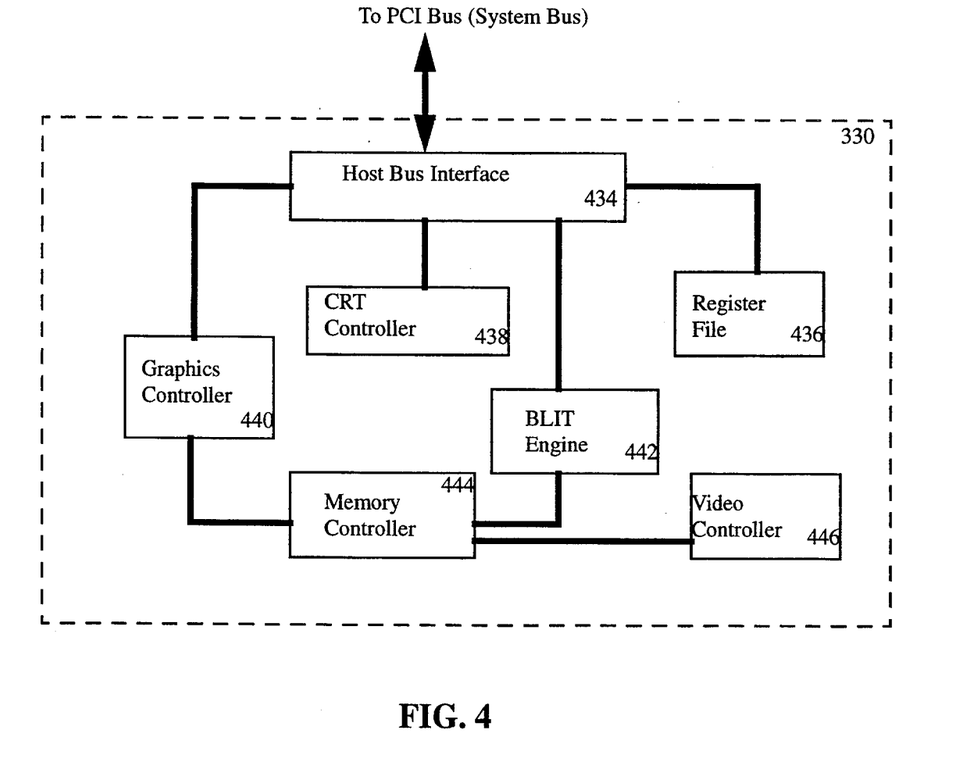
FIG. 4 is a block diagram of a video graphics controller implementing the present invention.

FIG. 4 is an overall block diagram of video graphics array 330. Host bus interface 434 connects video graphics array 330 to PCI bus 334. In addition to performing address decoding to access I/O devices and memory locations, host bus interface responds to applicable CPU commands and controls. The present invention resides inside host bus interface 434. Memory controller 444 is connected to graphics controller 440, BitBLT engine 442, and video controller 445. Memory controller 444 generates the timing signals (e.g., RAS, CAS) for the system display memory (not shown). In addition, memory controller 444 arbitrates over functions that compete for the limited bandwidth of display memory such as CPU access, screen refresh, dynamic-random-access-memory (DRAM) refresh, and BitBLT. Graphics controller 440 is connected between host bus interface 434 and memory controller 444 to perform text manipulation, data rotation, color mapping, and other operations. BitBLT engine 442 is connected to memory controller 444 and host bus interface 434. BitBLT engine 442 is designed to move data in packed-pixel modes with raster operations (ROP).

CRT controller 438 is connected to host bus interface 434. CRT controller 438 generates the HSYNC, VSYNC, and BLANK signal. Register file 436 is connected to host bus interface 434 and stores data for different modes of display resolution such as 320×200 pixels or 640×480 pixels. Video controller 446 is connected memory controller 444 to format data being transmitted to display device 332. Some of the screen display attributes controlled by video controller 446 include display color selection, text and cursor blinking, and underlining.

Figure 5:
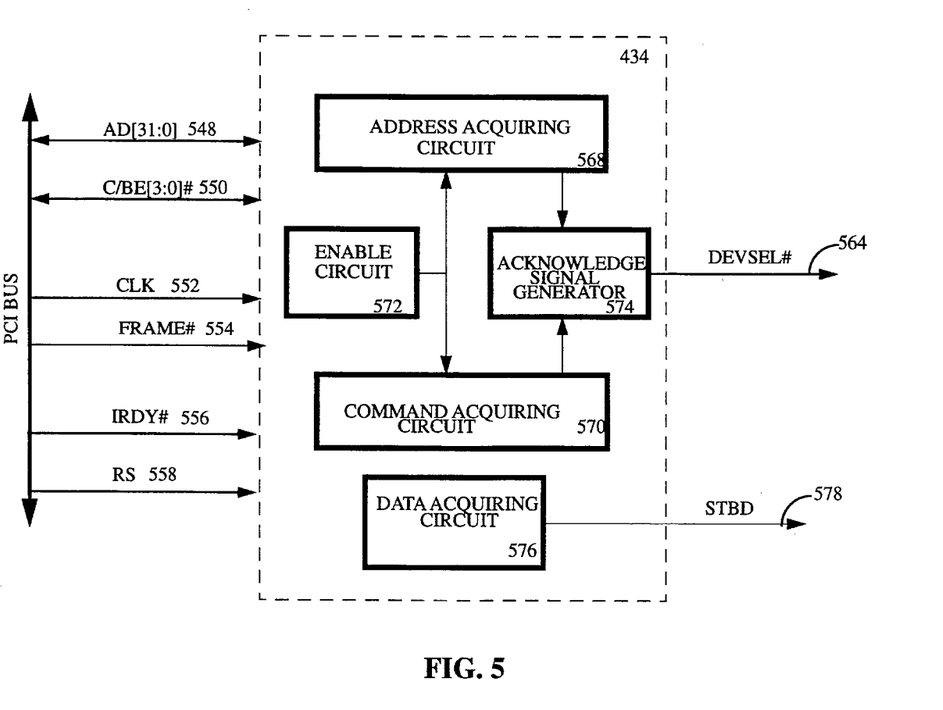
FIG. 5 is an overall block diagram of the host interface of the PCI bus target device shown in FIG. 4.

Referring now to FIG. 5 which is a block diagram of host bus interface 434 comprising address acquiring circuit 568, command acquiring circuit 570, enable circuit 572, acknowledge signal generator 574, and data acquiring circuit 576. Host bus interface 434 receives as inputs combined address & data signals AD 548, bus command & byte enables signal C/BE# 550, system clock signal CLK 552, bus transaction indicator signal FRAME# 554, reset signal RS 558, and initiator ready signal IRDY# 556. Host bus interface 434 outputs acknowledge signal DEVSEL# 564 and acquired data signal STBD[31:0] 578.

Address acquiring circuit 568, command acquiring circuit 570, enable circuit 572, and acknowledge signal generator 574 are not within the scope of the present invention and are briefly mentioned here for reference purpose. Address acquiring circuit 568, command acquiring circuit 570, enable circuit 572, and acknowledge signal generator 574 are discussed in detail as part of concurrently filed patent application "Method and Apparatus for Acquiring Bus Transaction Address and Command Information with No More Than Zero-Hold Time and with Fast Device Select Acknowledgement", Kanekal et al., which is incorporated herein by reference. The following description is limited to data acquiring circuit 576 which incorporates aspects of the present invention.

Figure 6:
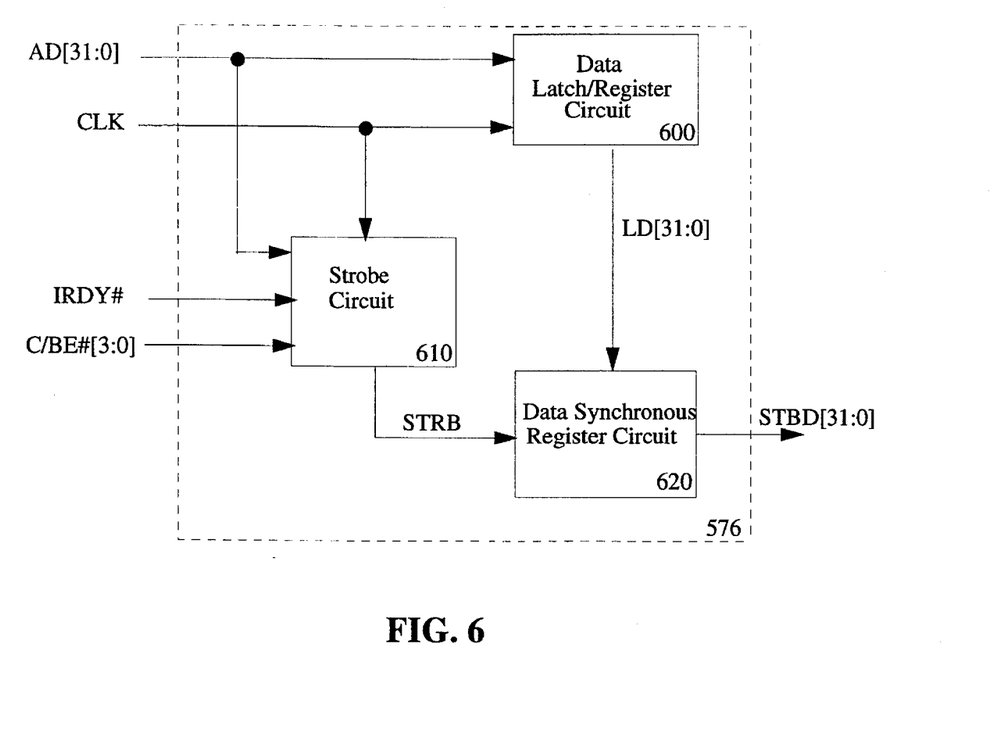
FIG. 6 is a block diagram of the data acquiring circuit shown in FIG. 5.

FIG. 6 is a block diagram illustrating details of data acquiring circuit 576. Data acquiring circuit comprises data latch/register circuit 600, strobe circuit 610, and data synchronous register circuit 620. Data latch circuit 600 receives as inputs address & data signals AD[31:0] and system clock signal CLK. Data information provided by address & data signals AD[31:0] is latched and outputted as signals LD[31:0] when clock signal CLK becomes LOW to ensure that the zero-hold time requirement is met and that valid bus transaction information is preserved. Signals LD [31:0] are provided as inputs to data synchronous register circuit 620. While the preferred embodiment supports a 32-bit bus, it is clear to a person of ordinary skill in the art that a different bus size (e.g., 64-bit bus) may also be supported by the present invention.

Strobe circuit 610 decodes bus transaction information captured to determine its validity and ensures that information to be acquired is data. Strobe circuit 610 receives as inputs address & data signals AD[31:0], command & byte enable signals C/BE[3:0], write transaction starting data phase signal IRDY#, and system clock signal CLK. Strobe circuit 610 decodes the type of bus transaction involved, the memory address range involved, and the byte lanes carrying data. Strobe circuit 610 asserts its output strobe signal STRB HIGH when a bus transaction is of a predetermined type, memory addresses are within an allowable range, at least one byte lane carries actual data information, and when write transaction starting data phase signal IRDY# is deasserted LOW indicating that a data phase is on. Strobe signal STRB is synchronized with system clock signal CLK. It should be clear to one of ordinary skill in the art that bus transaction starting data phase signal TRDY# can be used in a similar fashion to capture a read transaction data. As such, capturing read transaction data using bus transaction starting data phase signal TRDY# is within the scope of the present invention.

Data synchronous circuit 620 receives as its inputs strobe signal STRB and signals LD[31:0]. Upon being assured that data information is valid and at least one byte lane carries data, strobe signal STRB triggers data synchronous circuit 620 to capture/acquire data information from signals LD[31:0].

Figure 7:
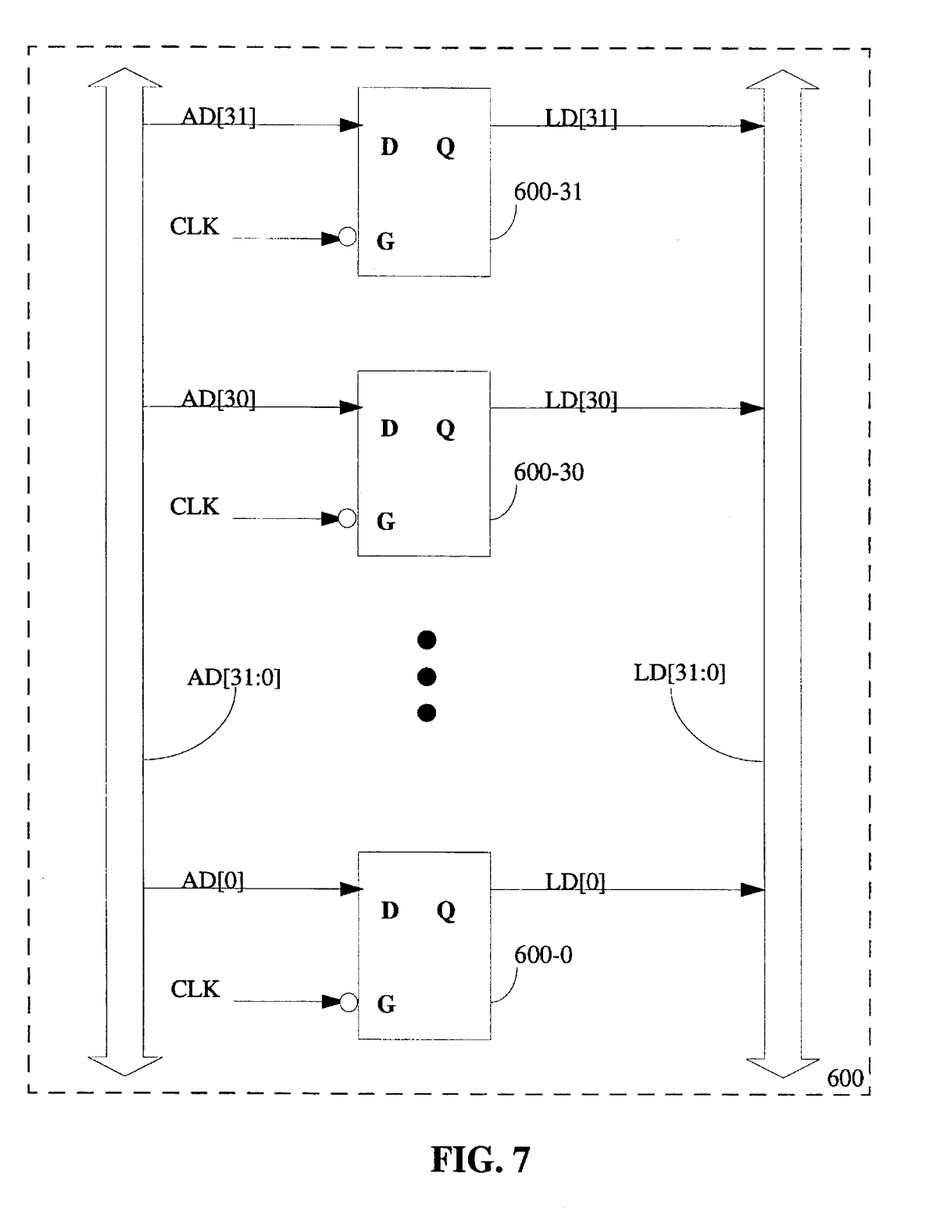
FIG. 7 is a block diagram of the data latch circuit shown in FIG. 6.

Data latch circuit 600 is illustrated in more detail in FIG. 7. Data latch circuit 600 comprises a plurality of latches 600-0 to 600-31, each having a data input D, an enable input G and an output Q. It should be clear to a person of ordinary skill in the art that the number of latches may be varied to accommodate different bus sizes (e.g. 64-bit bus) and the embodiment would still be within the scope of the present invention. Host CPU 12 supplies corresponding bits AD[0] to AD[31] of address & data signals 548 to data inputs D of latches 600-0 to 600-31 respectively via the PCI Local Bus. System clock signal CLK is provided as input to the enable inputs G of latches 600-0 to 600-31.

When system clock signal CLK is LOW, latches 600-0 to 600-31 are open, bits AD[0] to AD[31] of address & data signals AD[31:0] 548 are acquired as output data bits LD[0] to LD[31]. Since latches 600-0 to 600-31 are triggered by the logic level of system clock signal CLK or any decoded or data transaction validation signal instead of signal edges, latches 600-0 to 600-31 are designed to easily capture valid information presented by address & data signals AD[31:0] given the inherent state changes of signals AD[31:0] (i.e., from address to data information and vice versa). As such, latch circuit 600 allows valid data information to be available early on in the clock cycle which couples with address & data signals AD[31:0] being delayed internally with respect to system clock signal CLK help to satisfy the zero-hold requirement.

In the event an internal delay of address & data signals AD[31:0] in reaching data latch circuit 600 is more than an internal delay of system clock signal CLK in reaching data latch circuit 600, then a hold time of address data lines AD[31:0] as input to data latches 600-0 to 600-31 may be less than the required zero nano-seconds hold-time. While the term "internal" refers to being inside video graphics array 330, the term "external" refers to being outside video graphics array 330.

Figure 8:
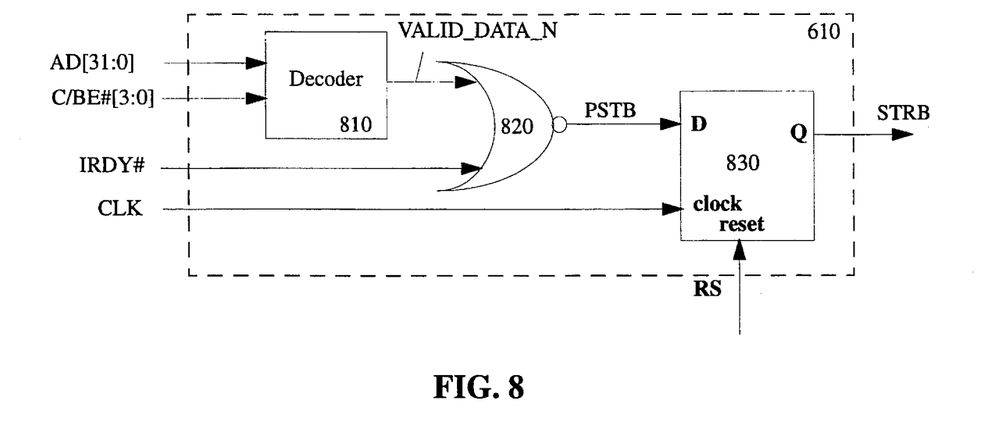
FIG. 8 is a block diagram of the strobe circuit shown in FIG. 6.

Referring now to FIG. 8 which is a block diagram illustrating acknowledge strobe circuit 610. Acknowledge signal generator 574 comprises decoder 810, NOR-gate 820, and D-type flip-flop 830. Decoder 810 receives as inputs address & data signals AD[31:0] and command & bytes enable signals C/BE[3:0]. Decoder 810 then determines whether memory addresses provided by address & data signals AD[31:0] is within an allowable range and whether a bus transaction request matches one of the preapproved types. Decoder 810 also determines from signals C/BE[3:0] whether data information is actually presented by determining whether at least one byte lane is carrying data information. Decoder 810 deasserts output signal VALID_ DATA_N LOW to indicate that the memory address range is within an allowable range, the bus transaction request matches one of the preapproved types, and at least one byte lane is carrying data information. Decoder 810 is not described any further because it is well-known technology.

VALID_DATA_N and write transaction starting data phase signal IRDY# are provided as inputs to NOR-gate 820. In short, NOR-gate 820 asserts its output signal PSTB HIGH when valid information is available and a bus transaction request is recognized. Otherwise, NOR-gate 820 asserts its output signal PSTB LOW.

Signal PSTB is sent to input D of D-type flip-flop 830. System clock signal CLK and system reset signal RS are provided as inputs to input clock and reset of flip-flop 830 respectively. Flip-flop 830 outputs signal STRB. Preferably, system reset signal RS resets output signal SRTB of flip-flop 830 to a LOW logic state.

Synchronous data flip-flop circuit 620 is implemented to register/acquire valid data information that are made available by data latch circuit 600. Synchronous data flip-flop circuit 620 is illustrated in more detail in FIG. 9. Synchronous address flip-flop circuit 784 comprises a plurality of D-type flip-flops 620-0 to 620-31, each having a data input D, a clock input clock, a reset input R, and an output Q. It should be clear to a person of ordinary skill in the art that the number of flip-flops may be varied to accommodate different bus sizes (e.g. 64-bit bus) and the embodiment would still be within the scope of the present invention.

Figure 9:
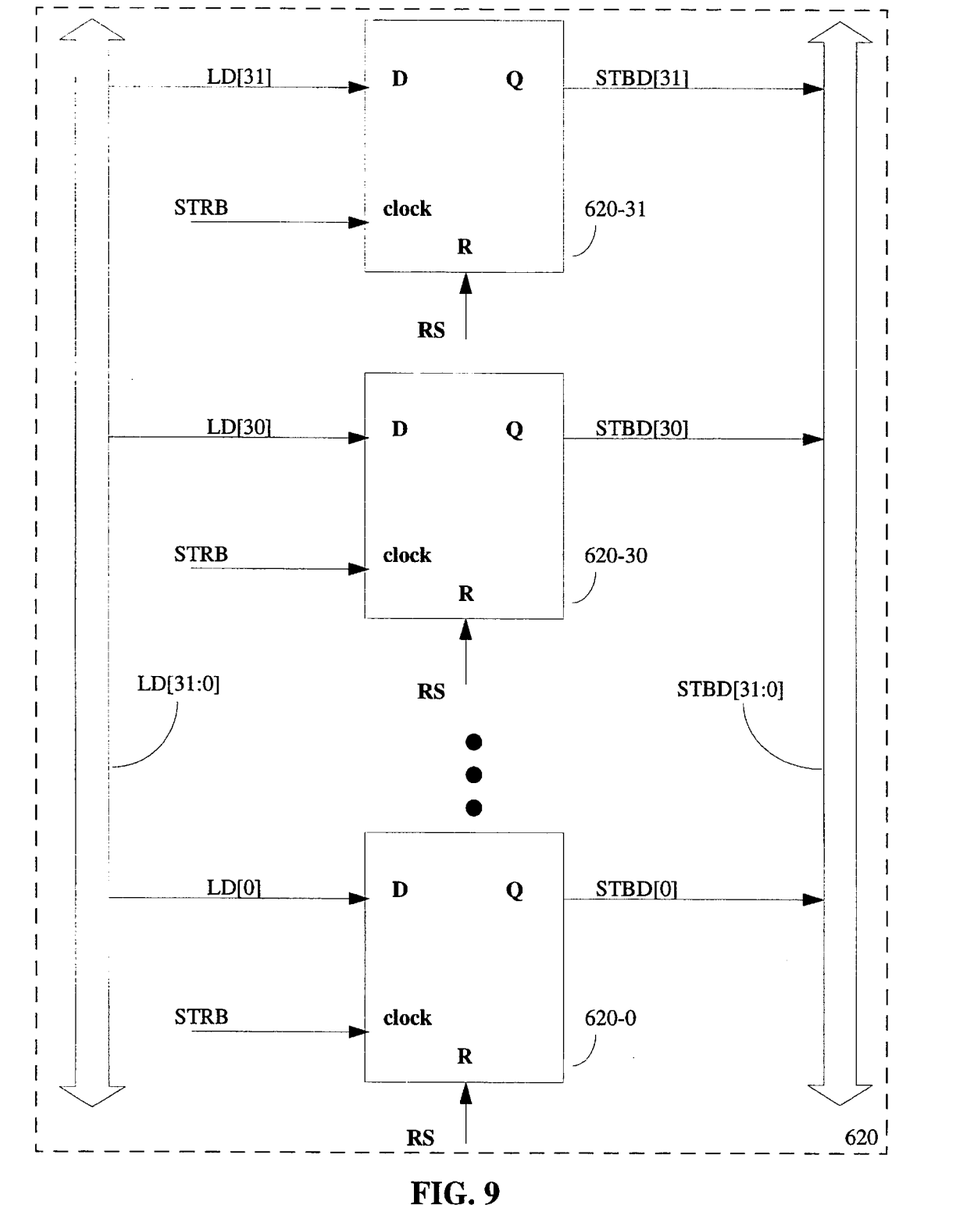
FIG. 9 is a block diagram of the synchronous data circuit shown in FIG 6.
Figure 10A:
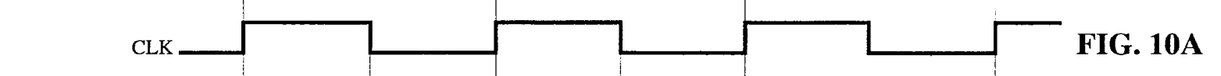
FIG. 10 is a timing diagram for the data acquiring circuit shown in FIG. 6.
Figure 10B:
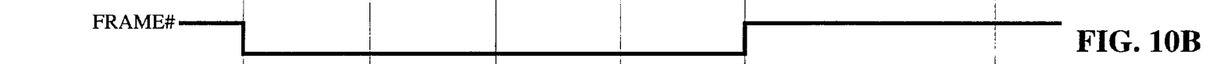
Figure 10C:
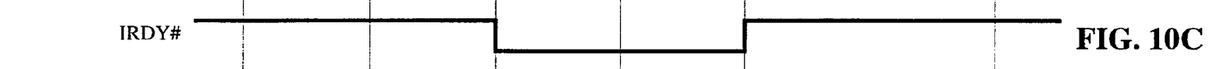
Figure 10D:
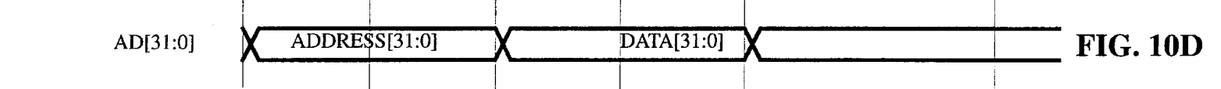
Figure 10E:
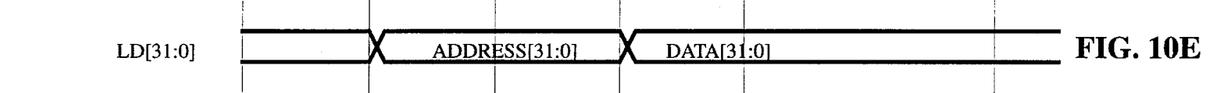
Figure 10F:
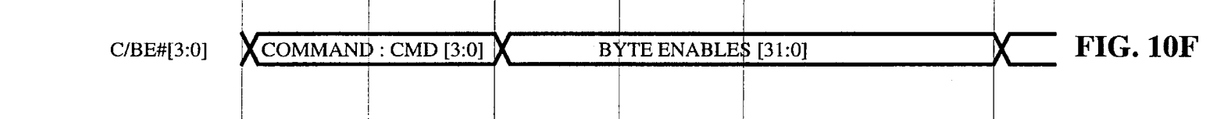
Figure 10G:
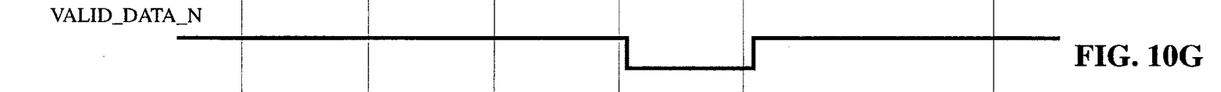
Figure 10H:
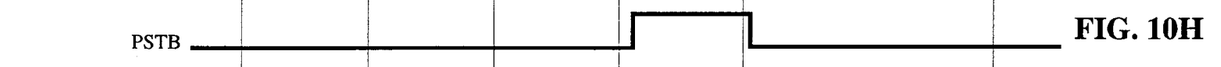
Figure 10I:
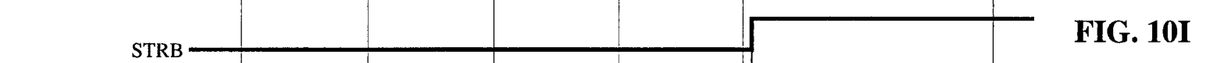
Figure 10J:
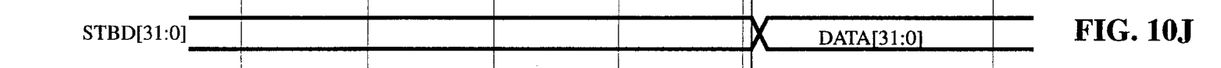

In the preferred embodiment, data latch circuit 600 supplies the corresponding bits LD[0] to LD[31] of address & data signals 1D[31:0] to data inputs D of flip-flops 620-0 to 620-31. Moreover, signal STRB is provided as input to clock inputs CLK of flip-flops 620-0 to 620-31. In addition, system reset signal RS is provided as input to reset inputs R of flip-flops 620-0 to 620-31. The rising edge of signal STRB triggers flip-flops 620-0 to 620-31 to pass the information received at its inputs D to its outputs Q.

To illustrate sequential logical states of data acquiring circuit 576, refer now to FIG. 10 which illustrates exemplary timing diagrams for data acquiring circuit 576. In the preferred embodiment, all bus transactional activities are synchronous to system clock signal CLK. Bus transaction signal FRAME# indicating the start of a bus transaction is activated LOW on a rising edge of clock signal CLK at time t1. Following the activation of signal FRAME#, address and command information are presented by address & data signals AD[31:0] and command & byte enable signals C/BE#[3:0] beginning at time t1. At time t2, address & data signals AD[31:0] and command & byte enable signals C/BE#[3:0] switch to data and byte enable phases respectively. At time t3, address & data signals AD[31:0] switch to an address phase. As such, writing transaction data phase signal IRDY# becomes activated at time t2 and deactivated at time t3. On the other hand, command & byte enable signals C/BE[3:0] continues with the same byte enable phase. In other possible scenarios not shown here, at time t3, address & data signals AD[31:0] may switch to a different address phase or continue with burst activity to generate more data. Likewise, in other scenarios, command & byte enable signals C/BE[3:0] may switch to a different command phase or continue with burst activity to generate more byte enables.

Bus transaction information provided by address & data signals[31:0] is acquired by data latch circuit 600 as signals LD[31:0] when the logic state of system clock signal CLK is LOW. As such, address information is acquired starting at time $t_A$. As illustrated, address information is made available by data latch circuit 600 until the logic state of clock cycle 2 becomes LOW. At that point, time $t_D$, there is a phase change and data information is made available. Similarly, data information remains available until the logic state of clock cycle 3 becomes LOW.

Upon completing the process of address, command, and byte enable information decoding to determine their validity, signal VALID_DATA_N is deasserted LOW following time $t_d$. However, to ensure that the information to be acquired is data, NOR-gate 820 combines signal VALID_DATA_N with data phase signal IRDY# to generate signal PSTB. As illustrated, the relationship between signal PSTB and signals VALID_DATA_N and IRDY# is consistent with the input-output logic of a NOR-gate. Signal PSTB is activated HIGH only when both signals VALID_DATA_N and IRDY# are LOW. Signal PSTB is synchronized to system clock signal CLK. The rising clock edge at time t3 triggers D-type flip-flop 830 to pass the logic state of signal PSTB to its output signal STRB. As a result, signal STRB becomes HIGH at time $t_s$ after a short delay following the rising clock edge at time t3. Signal STBD[31:0] is used to trigger synchronous data flip-flop circuit to 620 to register data information for the bus target.

While the preferred embodiment and various alternative embodiments of the invention has been disclosed and described in detail herein, it will be obvious to those skilled in the art that various changes in form and detail may be made therein without departing from the spirit and scope thereof. Moreover, it is to be understood that the detailed description of the present invention above is by way of illustration and example only and is not to be taken by way of limitation, the spirit and scope of the present invention being limited only by the terms of the appended claims.

We claim:

1. An apparatus for acquiring data information from a synchronous bus transaction which operates with no more than zero hold-time, comprising:

register means coupled to a system bus, said register means responsive to a predetermined logic state of a system clock signal for acquiring information provided by said synchronous bus transaction;

signal generating means coupled to said system bus and receiving said system clock signal as input, said signal generating means generates a synchronous signal indicating whether said information acquired is valid data information; and synchronous register means coupled to said register means and said signal generating means, said synchronous register means responsive to a predetermined edge of said indicating signal for registering valid data information acquired by said register means.

2. The apparatus of claim 1 wherein said register means comprises a plurality of latches, each of said latches corresponds to a binary bit of said synchronous bus transaction information.

3. The apparatus of claim 1 wherein said predetermined logic state of said system clock signal is a LOW logic state.

4. The apparatus of claim 1 wherein said signal generating means comprises:

a decoder receiving said synchronous bus transaction information as input, said decoder generating a valid signal when (1) memory addresses provided by said synchronous transaction information falls within a predetermined range, (2) a bus command provided by said bus transaction information is acceptable, and (3) there is data information included in said synchronous bus transaction information;

a NOR-gate receiving said valid signal from said decoder and a data phase indicating signal from said system bus, said NOR-gate generating a signal indicating whether said information acquired is valid data information; and a flip-flop receiving said indicating signal from said NOR-gate and said system clock signal as inputs, said flip-flop synchronizing said indicating signal to said system clock signal to produce said synchronous indicating signal.

5. The apparatus of claim 1 wherein said synchronous register means comprises a plurality of flip-flops, each of said flip-flops corresponds to a binary bit of said bus transaction information.

6. The apparatus of claim 1 wherein said predetermined edge of said synchronous indicating signal is a rising edge.

7. A computer system comprising:

a host processor;

a system memory;

a system bus coupling said host processor to said system memory; and a peripheral hardware controller interposed between said system bus and external devices; said peripheral hardware controller having an apparatus for acquiring data information from a synchronous bus transaction which operates with no more than zero hold-time, comprising:

register means coupled to a system bus, said register means responsive to a predetermined logic state of a system clock signal for acquiring information provided by said synchronous bus transaction;

signal generating means coupled to said system bus and receiving said system clock signal as input, said signal generating means generates a synchronous signal indicating whether said information acquired is valid data information; and synchronous register means coupled to said register means and said signal generating means, said synchronous register means responsive to a predetermined edge of said indicating signal for registering valid data information acquired by said register means.

8. The computer system of claim 7 wherein said register means comprises a plurality of latches, each of said latches corresponds to a binary bit of said synchronous bus transaction information.

9. The computer system of claim 7 wherein said predetermined logic state of said system clock signal is a LOW logic state.

10. The computer of claim 7 wherein said signal generating means comprises:

a decoder receiving said synchronous bus transaction information as input, said decoder generating a valid signal when (1) memory addresses provided by said synchronous transaction information falls within a predetermined range, (2) a bus command provided by said bus transaction information is acceptable, and (3) there is data information included in said synchronous bus transaction information;

a NOR-gate receiving said valid signal from said decoder and a data phase indicating signal from said system bus, said NOR-gate generating a signal indicating whether said information acquired is valid data information; and a flip-flop receiving said indicating signal from said NOR-gate and said system clock signal as inputs, said flip-flop synchronizing said indicating signal to said system clock signal to produce said synchronous indicating signal.

11. The computer system of claim 7 wherein said synchronous register means comprises a plurality of flip-flops, each of said flip-flops corresponds to a binary bit of said bus transaction information.

12. The computer of claim 7 wherein said predetermined edge of said synchronous indicating signal is a rising edge.

13. A method for acquiring data information provided by a synchronous bus transaction having at most zero hold-time, the method comprising:

acquiring information provided by said synchronous bus transaction in response to a predetermined logic state of a system clock signal;

determining whether said synchronous bus transaction information is valid data information;

generating a synchronous signal indicating that said synchronous bus transaction information is valid data information; and registering valid data information acquired in said acquiring step in response to a predetermined edge of said synchronous indicating signal.

14. The method of claim 13, wherein said step of determining whether said synchronous bus transaction information is valid data information includes the steps of:

determining whether data is part of said synchronous bus transaction information;

determining whether memory addresses provided by said synchronous bus transaction information falls within a predetermined range;

determining whether a bus transaction command is a predetermined type; and determining whether information being provided by said bus transaction information is data.

* * * * *